United States Patent [19]

Warner et al.

[11] Patent Number: 5,404,502

[45] Date of Patent: Apr. 4, 1995

[54] ERROR-DETECTION IN DATABASE UPDATE PROCESSES

[75] Inventors: Wes Warner, Unionville; Greg Hope, North Vancouver; Paul Oeuvray, West Vancouver, all of Canada

[73] Assignee: Prologic Computer Corporation, Richmond, Canada

[21] Appl. No.: 22,472

[22] Filed: Feb. 25, 1993

[51] Int. Cl.⁶ ............................................. G06F 11/00
[52] U.S. Cl. ................................... 395/575; 395/600
[58] Field of Search ............... 395/575, 600; 371/67.1, 371/69.1

[56] References Cited

FOREIGN PATENT DOCUMENTS

0425415A2  5/1991  European Pat. Off. .

OTHER PUBLICATIONS

PCT International Search Report, International application No. PCT/CA94/00099, International Filing Date Feb. 24, 1994.
Proceedings of the TAIS Conference: Temporal Aspects in Information Systems, 13–15 May, 1987, Sophia Antipolis, France, pp. 239–253, Saake, G. and Lipeck, U. W., "Foundations of Temporal Integrity Monitoring".
"Acta Informatica", vol. 28, No. 4, 1991, pp. 365–407, Hülsmann and G. Saake, Theoretical foundations of handling large substitution sets in temporal integrity monitoring.
Abstract–U.S. Pat. Ser. No. 4,646,229.
Abstract–RD 302003.
Abstract–WO 8904013.
Abstract–RD 295007.
Abstract–EP 350208.
Abstract–U.S. Pat. Ser. No. 4,961,139.
Abstract–U.S. Pat. Ser. No. 5,043,871.
Abstract–EP 455440.
Abstract–EP 362971.
Abstract–EP 306197.
Abstract–U.S. Pat. Ser. No. 4,940,072.
Abstract–WO 8601018.
Abstract–U.S. Pat. Ser. No. 4,686,620.
Abstract–EP 191036.
Abstract–EP 153856.
Abstract–U.S. Pat. Ser. No. 4,635,189.
Abstract–EP 153856.

Primary Examiner—Charles E. Atkinson
Attorney, Agent, or Firm—Staas & Halsey

[57] ABSTRACT

A technique for integrity error detection in a temporal transaction oriented database system. The database system has records and processing rules. Each record has an effective time. Each processing rule has a range of effective times. The record types include transaction records, master records, shadow master records and snapshot records. Each transaction record or snapshot record is related to one master record and each master record may have a plurality of related transaction and snapshot records. Each snapshot record is a copy of its related master record at a given effective time. On the insertion of one or more backdated transaction records or reversal of one or more existing transaction records the master record is recalculated by replaying from a prior snapshot forward, all processing rules and transaction records, having appropriate effective times. A shadow master record is recalculated by simultaneously repeating each of the steps of the replay on the shadow master record, but in this case ignoring any new backdated transactions and including any newly reversed transaction records. The comparison of the shadow master record after replay and the value of the master record before replay indicates the presence or absence of an integrity error.

10 Claims, 8 Drawing Sheets

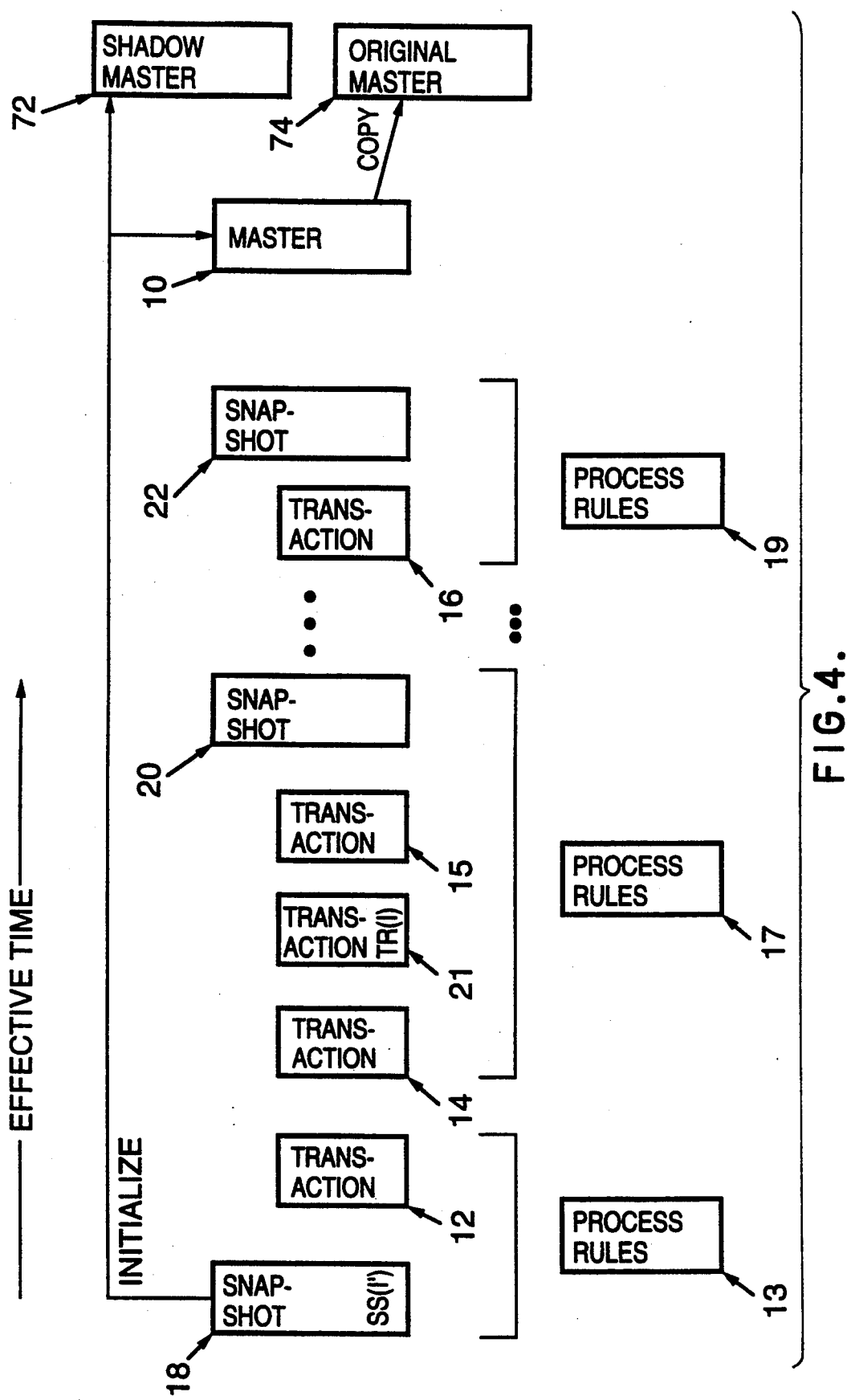

ERROR-DETECTION IN DATABASE UPDATE PROCESSES

FIELD OF THE INVENTION

The present invention relates to a method for detecting errors occurring in the modification and update of a temporal transaction oriented database.

BACKGROUND OF THE INVENTION

In many applications, particularly those involving banking and other financial record-keeping, computer systems are used which process time-ordered input data. The input data in such computer systems is typically processed by an application computer program. The application computer program makes use of a computer database system to recall stored data values (used in processing the input data) and to store newly processed data. Such computer database systems may be designed in many different ways. A survey of such database systems is found in C. J. Date, *An Introduction to Database Systems*, 4th Edition, 1986.

An example of a system which combines an application program and a database system is one typically found in a bank. The input to such a system may relate to deposits to or withdrawals for a given set of bank accounts. The application system creates the input and output screens used by the bank workers and processes the data in response to the users' input. The application program uses a database system to manage the storage and retrieval of financial and other data.

In a banking system as described, account records in the database system are used to store the current balance for each bank account. The application computer program processes inputs (for example a deposit to a bank account) to obtain updated values which the database system then stores in the account record for that account (for example to reflect the new current balance after the deposit into the account).

In a conventional database system, once input data is processed by the application program and the database system updates the value of the appropriate record, the original value of that record in the database system is overwritten and can no longer be recalled by the database system. Thus at any given point in time, a conventional database system maintains and presents one static "photograph" of the set of records (the "data domain") as of that one point in time.

Recently, temporal databases have been devised which can represent the progress of states within the database over a period of time. An example of current research in temporal database systems is set out in Rishe, Navathe and Tal, eds., *Databases: Theory, Design, and Application*, IEEE Computer Society Press, Los Alamitos, Calif., U.S.A., 1991, pages 139-150.

In a temporal database system, when the value of a record is changed, the old value is retained and a new value is inserted into the database. A temporal database system can thus also support requests for data "as of" any past point in time.

In both conventional and temporal databases the database system operates in a passive, record-keeping role. A conventional database provides access only to current data. A temporal database permits the past states of the database to be viewed as in a "motion picture" consisting of many "photographs in sequence" but there is no information retained in the database which indicates what operation or process was carried out on a particular stored state of the database to create the next successive state. In other words, there is no information available from the database to determine what user input or application processing took place to update a record in the database at any particular time.

The present invention relates to temporal transaction oriented databases. Temporal transaction oriented databases are relatively new to the art. Prologic Computer Corporation has developed a database system known as by the trade-mark "Probe" which makes extensive use of the concepts relating to temporal transaction oriented databases as set out below. Probe is described in "The Probe Application Developer's Handbook" and the "Probe Product Description" available from Prologic Computer Corporation.

In temporal transaction oriented databases, there are at least two types of data records—transaction records and master records. Each transaction record is retained in the database as a tuple of attribute-values, including at least the following values:

(a) the entry time of the transaction record in the database;

(b) the effective time of the transaction: when the action corresponding to the transaction record occurs in the business to which the database relates;

(c) detailed information about the transaction necessary for the updating of the master record. A master record may be recalculated by using a stored processing rule, as described in detail, below. Each master record has an associated time-sequenced set of transaction records. The time sequence is determined by the effective time value of each record. The database system inserts new transaction records in the time sequenced set of transaction records.

The effect of each transaction record on its associated master record is determined by the "processing rule" in effect at the effective time for each transaction record. Each processing rule has a range of effective times associated with it. This range defines when the processing rule is "in effect".

In a temporal transaction oriented database, execution of a transaction processing rule is automatically invoked by the database when triggered by the insertion of a new transaction. In the sense that data (the master record and its set of transaction records) is encapsulated with the business or processing rules for that data, a temporal transaction oriented database is related to object oriented databases, which are more fully discussed in Nahouraii and Perry, eds., *Object-Oriented Databases*, IEEE Computer Society Press, Los Alamitos, Calif., U.S.A., 1991.

Usually the transaction record with the most recent entry time in the time sequenced set of transaction records is also the transaction with the latest effective time. In effect, the latest transaction record to be inserted in the set of transaction records is the transaction record with the latest effective time. In such a case, the master record is updated by the insertion of the latest transaction record triggering the current processing rule.

It is also possible and desirable to support the insertion of new transaction records with effective times earlier than their entry times (delayed entries or backdated entries) and earlier than the effective time of other transaction records in the time sequenced set of transaction records. Conversely, it is possible and desirable that previously inserted transaction records which are later determined to be erroneous may be marked "reversed". In a temporal transaction oriented database, transaction records are typically retained until it is unlikely that there will be a need for backdates or reversals prior to that effective date. Marking a transaction record as "reversed" permits the temporal transaction oriented database system to ignore the record for most purposes but to retain the record for possible future use or reference.

By supporting delayed or backdated transaction records, and reversed transactions, a temporal transaction oriented database eliminates (automates) many "manual adjusting entries" that would otherwise be needed to correct for master record errors caused by delayed or erroneous entries.

A temporal transaction oriented database system must recalculate the current value of the master record if one or more new transaction records are inserted or if one or more existing transaction records are reversed. (The examples given below deal with the backdated insertion or reversal of a single record, the extension of the methods described to cases having more than one transaction will be apparent to one skilled in the art). In the case of a backdated insertion, a new value for the master record may be calculated by starting with the first (oldest) transaction record in the time sequenced set of transaction records and reprocessing that first transaction record and each subsequent transaction record in the set (including the newly inserted transaction record), using the processing rule in effect at the effective time of each transaction record. In the case of a reversed transaction record the same procedure may be followed but the reversed transaction record is not included in the recalculation of the master record.

The time required to reprocess all stored transaction records for a given master record may be long. A method which results in a shorter recalculation time after a backdated insertion or a reversal of a transaction record is implemented by causing the database system to periodically retain copies of the master record: to store "snapshots" of the master record. According to this method, the recalculation of the current master record value is commenced with the youngest snapshot with an effective time prior to the effective time of the transaction record being inserted.

As the above indicates, because the transaction records and associated processing rules are retained in a temporal transaction oriented database there is no need to retain a snapshot for each different prior state of a master record. Each master record may be recalculated and produced by the database system "as of" any point in time in the manner described above, by replaying the stored transaction records, using the related stored processing rules, commencing at the youngest snapshot which predates the point in time to which master record is being recalculated. Recalculation in this manner using stored processing rules can produce different master record states "as of" different points in time due only to the passage of time, without (or with) transactions during that time. Examples of this include the effect of interest in financial applications or shrinkage in inventory applications.

SUMMARY OF THE INVENTION

The present invention relates to a method for detecting errors which may occur in performing the recalculation of a master record in a temporal transaction oriented database. When such a database is updated by inserting backdated transaction records, or by reversing transaction records, integrity errors may occur. The fault conditions are:

(a) Misread, or omission of one or more, transaction records in the transaction set;
(b) Misread, or omission of one or more, snapshot records;
(c) Incorrect change, deletion, or update of a processing rule due to application programmer error or configuration error;
(d) Faulty execution of a processing rule due to equipment or system software error.

In order to detect such integrity errors, one aspect of the method of the current invention incorporates a duplication of the steps taken in replaying the stored transaction records in a temporal transaction oriented database. When recalculating the master record value after a backdated insertion or reversal of one or more transaction records, a second calculation of the master record value is carried out in parallel using the appropriate stored transaction records without using the transaction records that were newly inserted or reversed. The value calculated in this fashion is termed a "shadow master record". A shadow master record is required only during recalculation and it is not necessary to permanently store the value.

An aspect of the present invention provides an indication of whether the recalculation of the master record was performed on a database containing an integrity error, and whether, in effect, the recalculation would result in an inaccurate new value for the master value record being stored. The detection of an integrity error occurs if the final shadow master record is not the equivalent of the master record value before the recalculation took place. A detected integrity error would typically result in the database "undoing" any updates, logging the detected error, and passing a signal to the associated application program, or to the user, of the error. Due to the simultaneous calculation of a shadow master record, detection of an integrity error according to the method of the invention is accomplished with the use of fewer computing resources than would otherwise be the case.

Integrity error checking occurs during the processing of each backdated or reversed transaction. It may also be invoked as a background process to provide early warning of the occurrence of fault conditions (a) through (d) listed above. In this case a background integrity checking process simulates a null backdated transaction at a given effective time. The integrity error detection will be carried out from the effective time of the backdated null transaction to the effective time of the master record. This null transaction is processed when the database system would otherwise be idle and thus does not impact normal transaction processing. In a database system having more than one master record, such null transactions may be backdated for each of the master records, in turn. Any errors detected may be logged for investigation. Having detected no integrity error, the background process may further purge or delete transaction records and snapshot records having effective times prior to a designated purge time. The purged records are replaced with one snapshot record having an effective time equal to that of the purge time.

Error detection according to the invention may be accomplished by computer hardware, software, or a combination. The implementation of the method and apparatus of the invention will be apparent to one skilled in the art and will not be described herein. As will be apparent, the records in a temporal transaction oriented database may be stored in one of several types of memory devices used in a computer, or may be stored in different devices at different times. The selection of such devices will vary according to the architecture of the computer system being used.

According to one aspect of the invention, a method of detecting integrity errors in a temporal transaction oriented database system having a plurality of transaction records is provided. The system has at least one backdated or reversed transaction record, a master record, a set of snapshot records storing values of the master record at predetermined effective times, a shadow master record, a set of stored processing rules, a plurality of record data values associated with the records representing an effective time for each of the records, and a plurality of rule data values associated with the processing and representing a range of effective times for each rule. The method has the following steps:

(a) storing a duplicate of the master record;
(b) retrieving a first record data value representing the effective time of the backdated or reversed transaction record;
(c) retrieving a snapshot record having a second record data value which is the most recent effective time prior to the first data value;
(d) copying the retrieved snapshot record into the master record and into the shadow master record;
(e) for each record and rule data value representing effective time later than the second data value, simultaneously
  i) executing respective associated stored processing rules on the master record and on respective transaction records; and
  ii) executing respective stored processing rules on the shadow master record and on respective transaction records, excluding any of the backdated transaction records but including any of the reversed transaction records; and
(f) comparing the duplicate of the master record with the shadow master record and in the event of a difference therebetween signalling the presence of an integrity error.

According to a further aspect of the invention, an apparatus is provided for detecting integrity errors in a temporal transaction oriented database system having a plurality of transaction records, at least one backdated or reversed transaction record, a master record, a set of snapshot records storing values of the master record at predetermined effective times, a shadow master record, a set of stored processing rules, and a plurality of data values associated with the rules and the records representing an effective time for each of the rules and the records. The apparatus having:

(a) means for storing a duplicate of the master record;
(b) means for retrieving a first data value representing the effective time of the backdated or reversed transaction record;
(c) means for retrieving a snapshot record having a second data value which is the most recent effective time prior to the first data value;
(d) means for copying the retrieved snapshot record into the master record and means for copying the retrieved snapshot record into the shadow master record,
(e) means for simultaneously
  i) executing respective associated stored processing rules on the master record and on respective transaction records for each effective time later than the second data value; and
  ii) executing respective stored processing rules on the shadow master record and on respective transaction records, excluding any of the backdated transaction records but including any of the reversed transaction records for each effective time later than the second data value; and
(f) means for comparing the duplicate of the master record with the shadow master record and in the event of a difference therebetween signalling the presence of an integrity error.

BRIEF DESCRIPTION OF THE DRAWINGS

Details of a preferred embodiment of the invention may be more readily ascertained from the following detailed description when read in conjunction with the accompanying drawings, wherein:

FIG. 4 is a block diagram of a system which illustrates the method of the invention;

Specification

Figure 1:
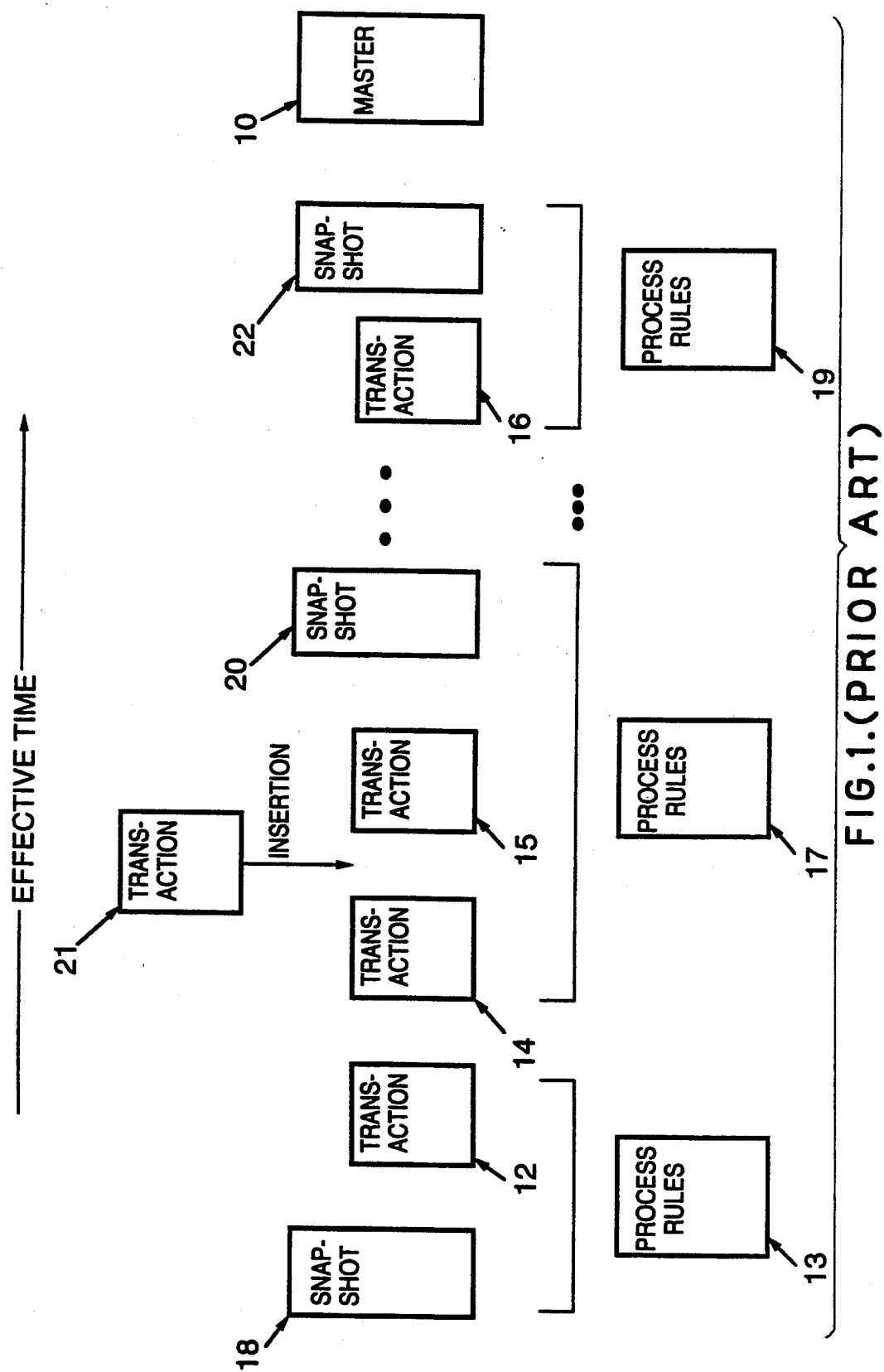
FIG. 1 is a block diagram of a prior art temporal transaction oriented database system wherein the present invention may be practiced.

Turning now to FIG. 1, the insertion of a backdated transaction record in a temporal transaction oriented database is shown according to the prior art, with no integrity error checking.

In the temporal transaction oriented database system illustrated in FIG. 1, having a master data record 10 and in which transaction records 12, 14, 15 through 16 are ordered sequentially by effective time of each transaction record. Processing rules 13, 17 through 19 are carried out on the master data record 10 in accordance with transaction records 12, 14, 15 through 16. The processing rules are applied to the transaction records with effective times corresponding to the effective time ranges of the processing rules. For example, the effective time range of processing rule 17 includes the effective times of transaction records 14 and 15. In the example of FIG. 1, the temporal transaction oriented database system applies the processing rule 13 in effect for effective time of transaction record 12 to update the value in master data record 10. The temporal transaction oriented database system then applies the processing rule 17, using the transaction record 14 data and the master record 10 value, as newly updated by transaction record 12 and processing rule 13, to determine the new updated value of master record 10.

Periodically, the values in master data record 10 are copied and stored in snapshot records 18, 20 through 22. The snapshot records 18, 20 through 22 keep intermittent record of the cumulative effect of the system operation following insertion of transaction records 12, 14, 15 through 16 as specified by associated processing rules 13, 17 through 19.

In certain circumstances, it is necessary to either add new transaction records to, or reverse (effectively but not actually, remove) transaction records in the set of transaction records 12, 14, 15 through 16. The value of the master data record 10 is dependent upon the cumulative effect of the insertion of transaction records 12, 14, 15 through 16, which involves the application of related processing or business rules 13, 17 through 19. Inserting transaction record 21, for example, requires the recalculation of the value of the master data record 10. The system inserts the modified transaction record 21, which results in the execution of processing rule 17 which is in effect at the effective time of transaction record 21. The new resultant value for master record 10 will require a recalculation based on the transaction records which follow transaction record 14, i.e. transaction records 15 through 16 and their associated process rules, i.e. process rules 17 through 19.

One method of recalculating the master data record 10 following the insertion of transaction record 21 is to copy the value of the snapshot record which immediately precedes the effective date of transaction record 21 (snapshot record 18) into the master data record 10. The system then processes the transaction records with effective dates following snapshot record 18 which has been copied into master data record 10. Any snapshot records more recent than snapshot 18 are likewise updated to correctly reflect the insertion of transaction record 21. The transaction record 21 is included in the transaction set which is processed by the system. The result is that the master data record 10 is recalculated to reflect the change made to the transaction records by inserting transaction record 21.

Figure 2:
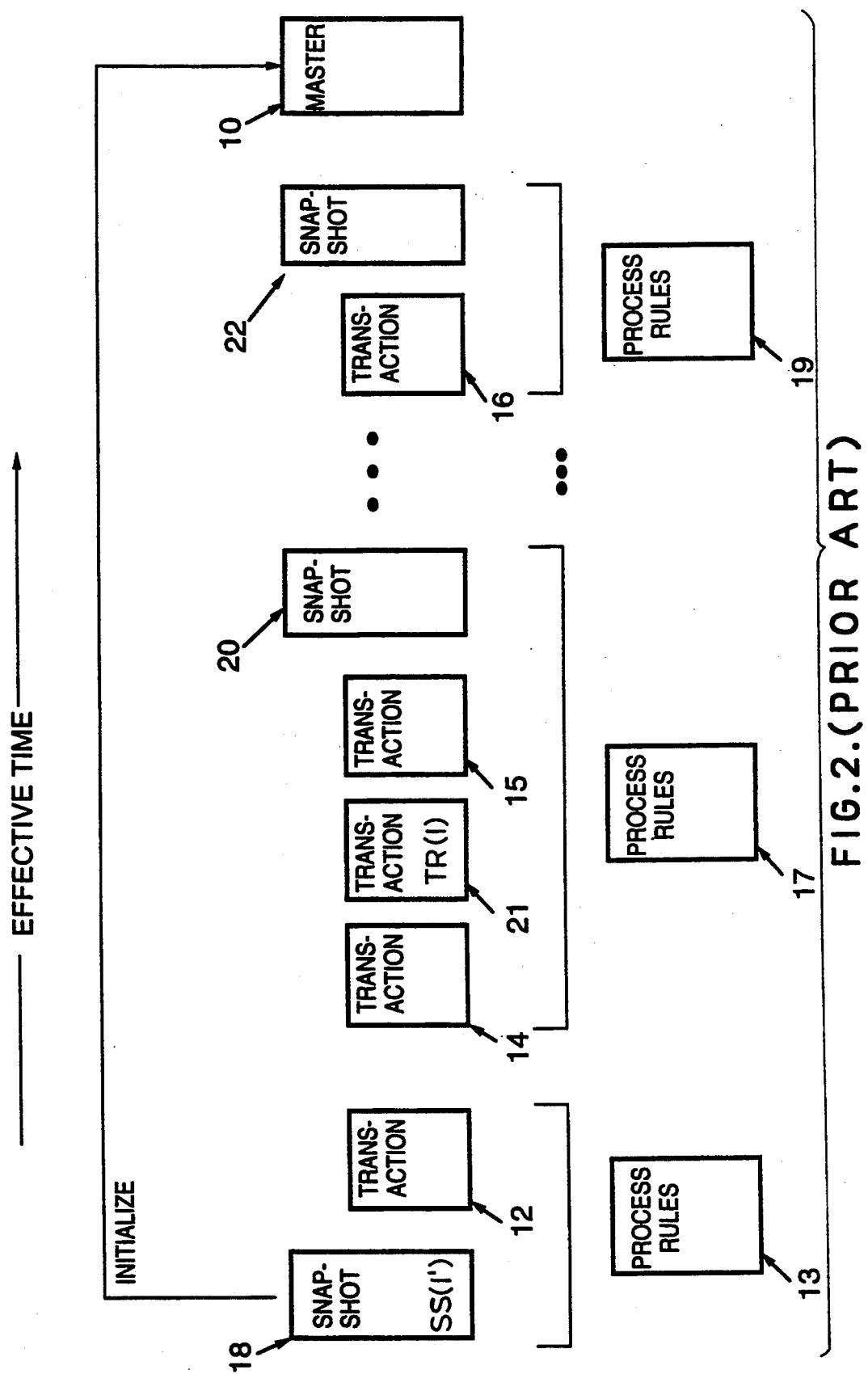
FIG. 2 is a block diagram of a prior art temporal transaction oriented database system which illustrates the method of replaying stored transaction records.

Referring to FIG. 2, an example is shown in more detail of how, according to the prior art, a temporal transaction oriented database is updated by backdating the insertion of a transaction record.

Transaction Record 21 in FIG. 2 is the transaction record which is to be inserted, by backdating, in the database. As is seen in the block diagram of FIG. 2, the transaction record 21 has an effective time which gives it a distinct position in the transaction record set. The snapshot record 18 in FIG. 2 is the most immediate preceding stored image of the master data record 10 as it existed before the effective time of transaction record 21. In this example, the snapshot record 18 was made immediately before the effective time of transaction record 12.

In order to update the master data record 10, the value of master data record 10 is first initialized to the value of snapshot record 18. Process rule 13 is applied to the transaction record 12 and the master record 10 to update master record 10. Processing rule 17 is then applied to the transaction record 14 and the new master record 10 to update master record 10. Processing rule 17 is then applied to the transaction record 21 and the new master record 10 to update master record 10. The sequence of applying the processing rules corresponding to the effective time of the next transaction record to that record and the new master record is repeated until the last transaction record, in FIG. 2 transaction record 16, has been processed. Snapshot records are also recalculated during this process. Finally, processing rule 19 is applied to the master record 10 to reflect the passage of time from transaction record 16 to the present. The resulting master record 10 reflects the updated database.

Figure 3A:
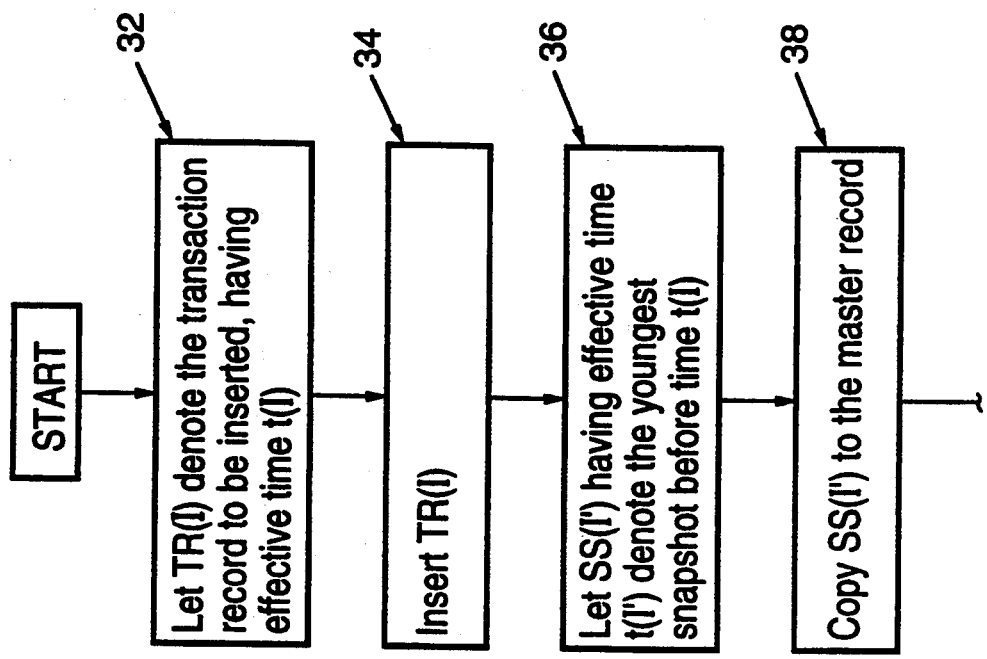
FIG. 3 is a generalized flow chart illustrating a prior art method for replaying a temporal transaction oriented database without integrity error detection.
Figure 3B:
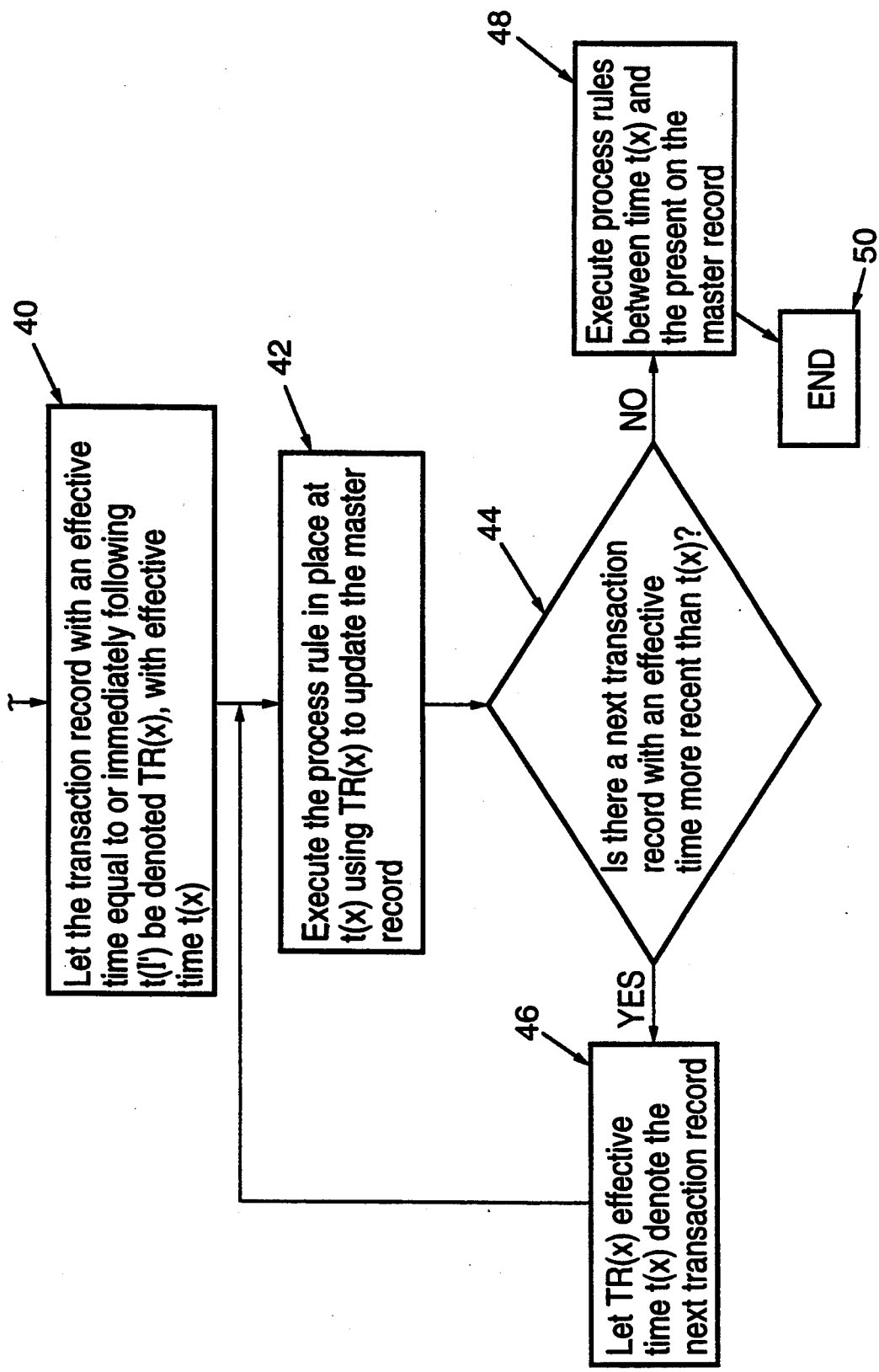

Turning now to FIG. 3, a flow chart corresponding to the method illustrated with reference to FIG. 2 is set out. Step 32 identifies the transaction record to be inserted (TR(I)) and its effective time (t(I)). In step 34 the transaction record is added to the existing transaction records. The snapshot in the system which is earlier than but temporally closest to t(I) is identified (SS(I')) as is its effective time (t(I')), in step 36. In step 38 SS(I') is copied to the master record 10.

In step 40 the transaction record to be processed is identified (as TR(x)). Steps 42 through 46 carry out the replaying of successive transaction records. Step 48 updates the master record value for the time period from t(x) to the present.

Referring now to FIG. 4, the figure shows a system on which a method incorporating the present invention is carried out. In the example of FIG. 4, the method detects integrity errors in a temporal transaction oriented database in the recalculation of the master record following the insertion of a transaction record. The transaction record to be inserted is transaction record 21 in FIG. 4. Snapshot 18 in FIG. 4 is the most immediate snapshot previous to the effective time of transaction record 21. The snapshot 21 in this example is a copy of the Master Record Data 10 as it stood immediately before the effective time of transaction record 12.

In one aspect of the method of the invention, two master records are used in the replay of the transaction record sequence: master record 10 and shadow master record 72. An initial step in the method is to store a copy of the master record 10 as it was before the insert and integrity error check are begun. In the example of FIG. 4, the value of master record 10 is copied to original master record 74. Snapshot record 18 is then copied into both master record 10 and shadow master record 72.

The method of the invention involves a replay of the transaction records commencing at transaction record 12, using processing rule 13. The transaction records are replayed in association with the related processing rules. The results of the application of the appropriate processing rules to the transaction records and master record 10 and shadow master record 72 are recorded in master record 10 and shadow master record 72, respectively.

A special case occurs when the inserted transaction record in the example of FIG. 4, transaction record 21, is replayed. In this case the system replays transaction record 21 with respect to processing rule 17 to alter master record 10, only. The value of shadow record 72 is therefore not updated in respect of inserted transaction record 21 and its associated processing rule 17.

The system then replays the transaction records and associated processing rules until all transaction records have been replayed, in the example, up to and including transaction record 16 and processing rule 19 of FIG. 4. In the absence of the fault conditions referred to above, this method results in a replay of the transaction records as they were before the insertion of the new transaction record. This value is held in the shadow master record 72. The method also provides a calculation of the master record 10 resulting from the newly inserted transaction record.

Once the transaction records have been replayed, the shadow master record 72 is compared with the original master record 74. If these records are not identical, there has been an integrity error detected.

Figure 5A:
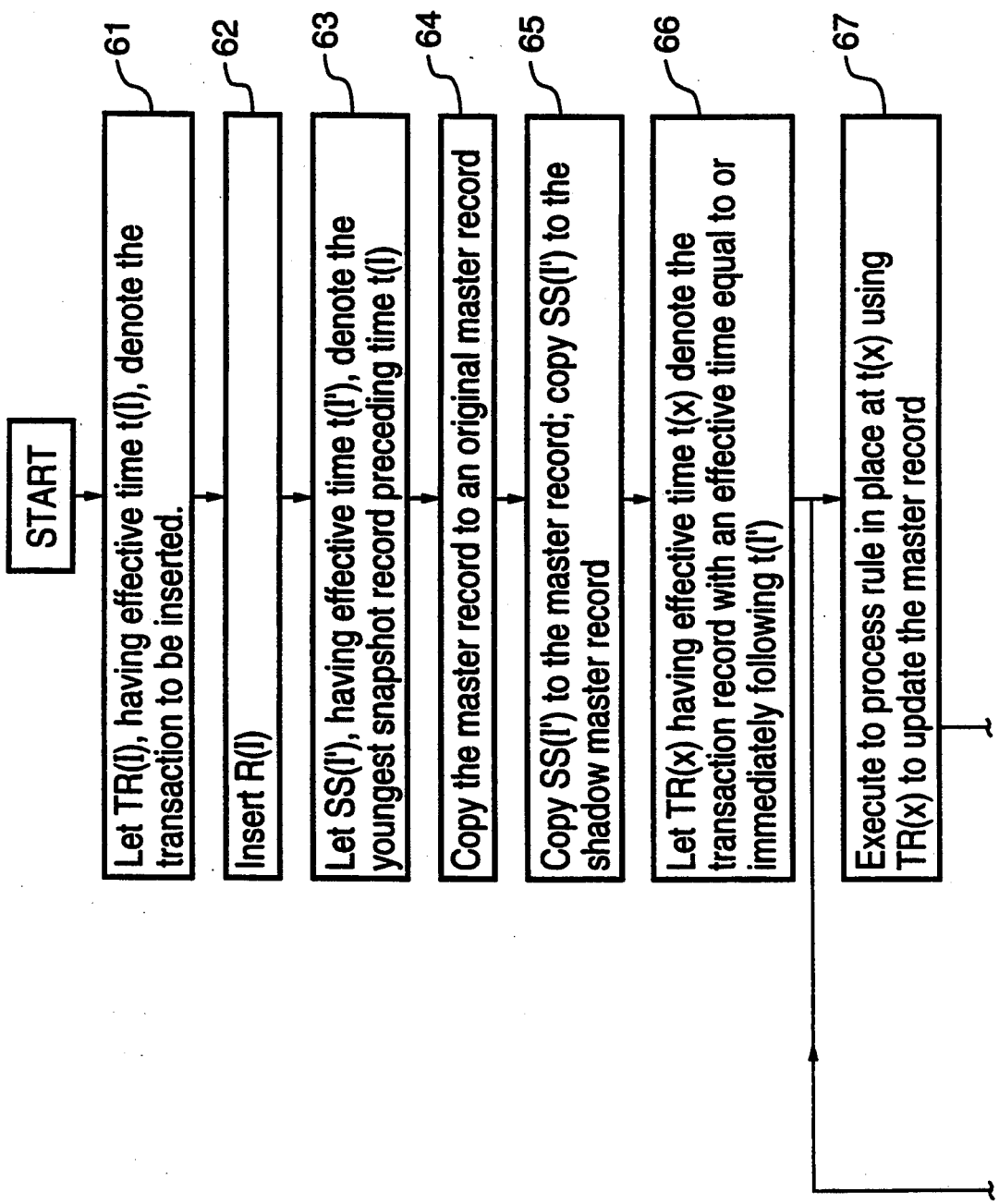
FIG. 5 is a generalized flow chart illustrating the method of the invention.
Figure 5B:
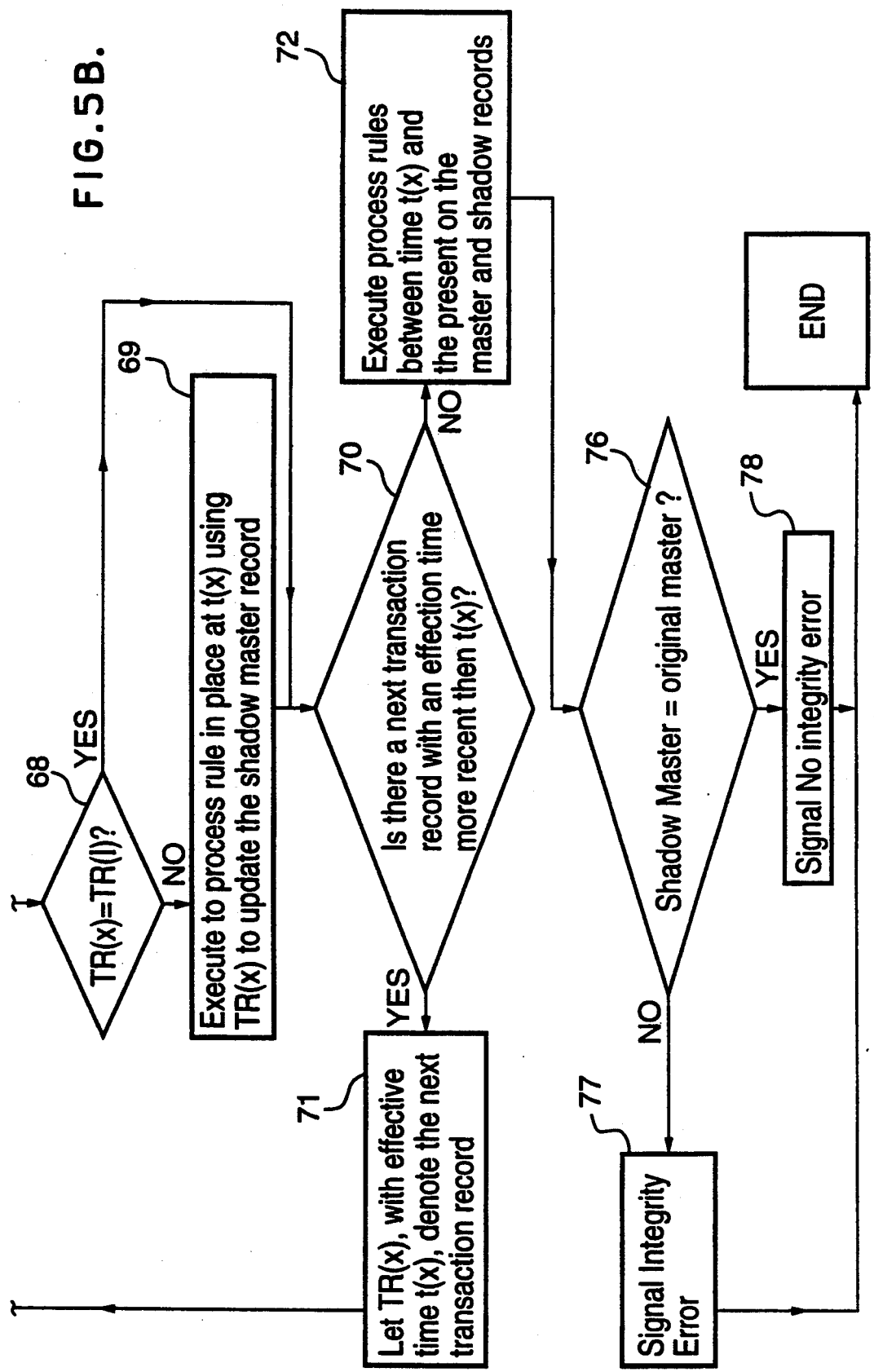

The flow chart corresponding to the above method is shown in FIG. 5. The steps 61 to 67 in FIG. 5 correspond to steps 32 to 42 in FIG. 3, except that the master record is retained (step 64) and the shadow master record is initialized (step 65).

Decision step 68 and step 69 provide that the shadow master record is updated for all transaction records except the newly inserted transaction record (TR(I)).

Following processing of all transaction records (determined by steps 70 and 71) and updating of master record and shadow master record (including step 72) the shadow master record is compared to the original master record (step 76), to determine if an integrity error exists (step 77) or not (step 78).

The method of invention is also able to detect integrity errors in cases when a transaction record is to be "reversed", or effectively (but not actually) removed, from the system. In many cases, a temporal transaction oriented database system does not permit a transaction record to be erased for a specified period. Rather the transaction record remains in the database system but is flagged to indicate that it is not to be included in calculating the value of the current master record. In effect, the system retains, but during replay/recalculation it ignores, the transaction record that is reversed.

The process of reversing a transaction record also involves a recalculation of the value of the master record. The method of the invention provides for integrity error detection during the recalculation of the master record due to a transaction reversal.

Figure 6:
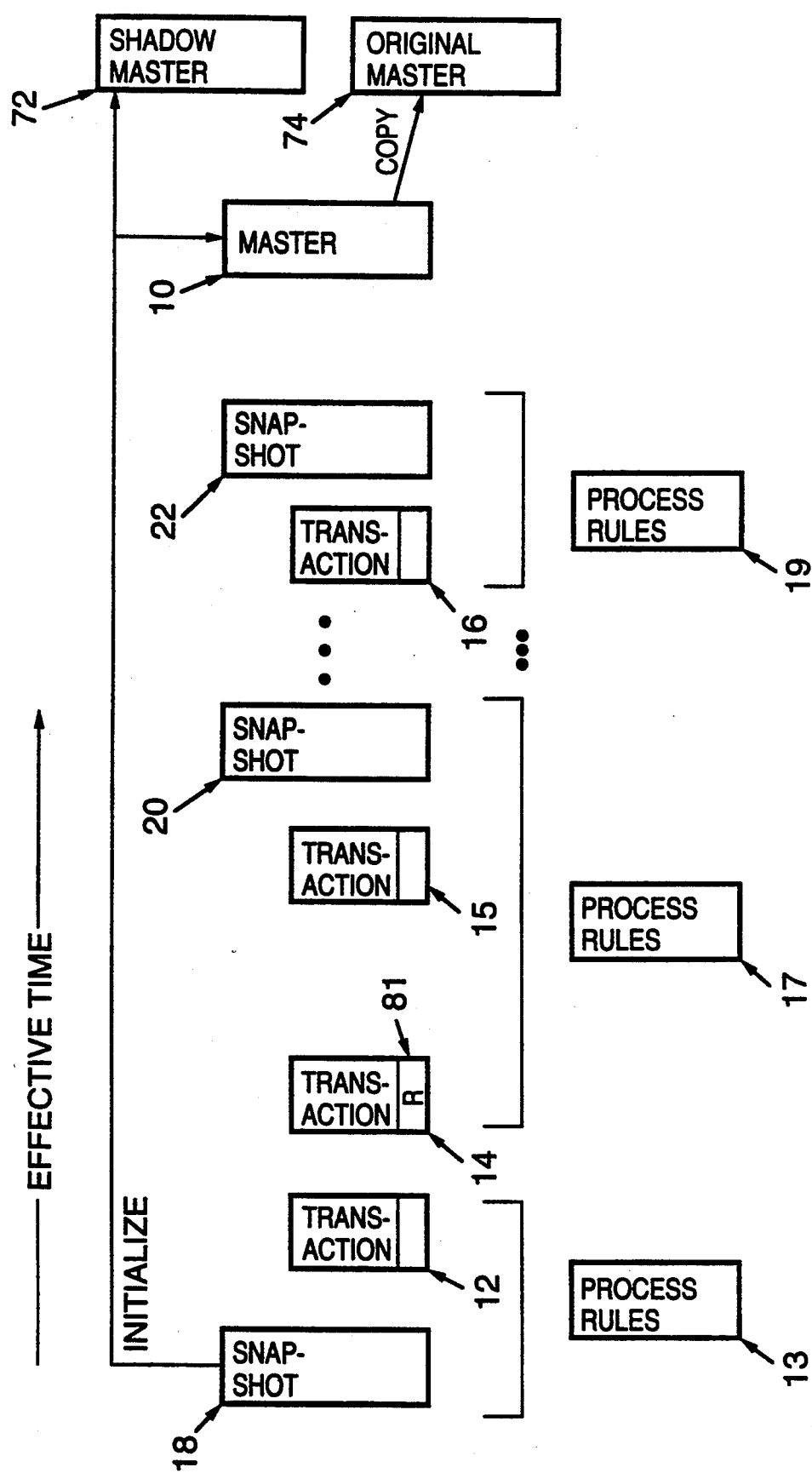
FIG. 6 is a block diagram of a system which illustrates a transaction record reversal according to one aspect of the method of the invention.

Turning to FIG. 6, a temporal transaction oriented database is shown in which transaction record 14 is to be reversed. In the method of the invention, transaction record 14 is updated to show that it is to be treated by the database as reversed. In this example, indicator 81 is altered to show that transaction record 14 is reversed. The value of the master record 10 is then recalculated. As described above, the snapshot record immediately preceding the reversed transaction record 14 is retrieved: in this example snapshot record 18. The master record 10 is then copied to original master record 74 and the value of snapshot record 18 is copied to master record 10 and shadow master record 72. Transaction records 12, 14, 15 through 16 are then replayed on both the master record 10 and the shadow master record 72, using the appropriate process rules 13, 17 through 19. According to the method of the invention, however, the reversed transaction record 14 is not included in recalculating the value of master record 10, but is included in recalculating the value of shadow master record 72. Once the set of transaction records has been replayed, the values of the shadow master record 72 and the original master record 74 are compared. If the values are different, an integrity error is declared.

Other variations and modifications of the invention are possible. For example, in temporal transaction oriented database systems which permit the updating of existing transaction records, those skilled in the art will appreciate that the method of the invention may be used to perform integrity error detection during the recalculation of a master record following such a transaction record update. All such modifications or variations are believed to be within the sphere and scope of the invention as defined by the claims appended hereto.

We claim:

1. A method of detecting integrity errors in a temporal transaction oriented database system having a plurality of transaction records, at least one backdated or reversed transaction record, a master record, a set of snapshot records storing values of the master record at predetermined effective times, a shadow master record, a set of stored processing rules, a plurality of record data values associated with respective ones of said records representing an effective time for each of said respective ones of said records, and a plurality of rule data values associated with respective ones of said processing rules representing a range of effective times for each of said respective ones of said processing rules, comprising the steps of:
   (a) storing a duplicate of said master record;
   (b) retrieving a first predetermined one of said record data values representing the oldest effective time of said one or more backdated or reversed transaction records;
   (c) retrieving a predetermined one of said snapshot records having a second predetermined one of said record data values representing a most recent effective time prior to that represented by said first predetermined one of said data values;
   (d) copying said retrieved snapshot record into said master record and into said shadow master record;
   (e) for each of said record and rule data values representing effective times later than that represented by said second predetermined one of said data values, simultaneously
      i) executing respective associated ones of said stored processing rules on said master record using respective associated ones of said transaction records; and
      ii) executing respective associated ones of said stored processing rules on said shadow master record using respective associated ones of said transaction records, excluding any of said backdated transaction records but including any of said reversed transaction records; and
   (f) comparing said duplicate of the master record with said shadow master record and in the event of a difference therebetween signalling the presence of an integrity error.

2. A method as claimed in claim 1 in which the backdated or reversed transaction record is a null backdated transaction record.

3. A method as claimed in claim 2 in which the method is carried out as a background process on a computer.

4. A method as claimed in claim 3 in which upon the comparison of the master record and the shadow master record, and upon determining that the two said records have identical values, a purge of transaction and snapshot records is carried out.

5. A method as claimed in claim 4 in which the purge comprises the following steps:
   (a) for each of said record and rule data values representing effective times earlier than a predetermined purge time, deleting the associated transaction and snapshot records and processing rule; and
   (b) creating a snapshot record having a record data value corresponding to an effective time that is equal to the purge time.

6. An apparatus for detecting integrity errors in a temporal transaction oriented database system having a plurality of transaction records, at least one backdated or reversed transaction record, a master record, a set of snapshot records storing values of the master record at predetermined effective times, a shadow master record, a set of stored processing rules, a plurality of record data values associated with respective ones of said records representing an effective time for each of said respective ones of said records, and a plurality of rule data values associated with respective ones of said processing rules representing a range of effective times for each of said respective ones of said processing rules, comprising:

(a) means for storing a duplicate of said master record;

(b) means for retrieving a first predetermined one of said record data values representing the effective time of said backdated or reversed transaction record;

(c) means for retrieving a predetermined one of said snapshot records having a second predetermined one of said record data values representing a most recent effective time prior to that represented by said first predetermined one of said data values;

(d) means for copying said retrieved snapshot record into said master record and means for copying said retrieved snapshot record into said shadow master record, (e) means for simultaneously
  i) executing respective associated ones of said stored processing rules on said master record and on respective associated ones of said transaction records for each of said record and rule data values representing effective times later than that represented by said second predetermined one of said record data values; and ii) executing respective associated ones of said stored processing rules on said shadow master record and on respective associated ones of said transaction records, excluding any of said backdated transaction records but including any of said reversed transaction records, for each of said record or rule data values representing effective times later than that represented by said second predetermined one of said record data values; and (f) means for comparing said duplicate of the master record with said shadow master record and in the event of a difference therebetween signalling the presence of an integrity error.

7. An apparatus as claimed in claim 6 in which the backdated or reversed transaction record is a null backdated transaction record.

8. An apparatus as claimed in claim 7 in which the said apparatus comprises a means for carrying out the process as a background process.

9. An apparatus as claimed in claim 8 further comprising a means for purging transaction and snapshot records.

10. An apparatus as claimed in claim 9 in which the means for purging transaction and snapshot records comprises.

(a) means for deleting transaction and snapshot records and processing rules for each of said rule and record data values representing an effective time earlier than a predetermined purge time; and (b) means for creating a snapshot record having a record data value corresponding to an effective time that is equal to the purge time.

* * * * *

UNITED STATES PATENT AND TRADEMARK OFFICE
CERTIFICATE OF CORRECTION

PATENT NO. : 5,404,502
DATED : April 4, 1995
INVENTOR(S) : Warner et al.

It is certified that error appears in the above-indentified patent and that said Letters Patent is hereby corrected as shown below:

Column 1, line 53, after "Design" change "." to --,--.

Column 2, line 27, after "record." start new paragraph.

Column 2, line 51, change "Perry" to --Petry--.

Column 12, line 26, change "." to --:--.

Signed and Sealed this

Eighteenth Day of July, 1995

Attest:

BRUCE LEHMAN

*Attesting Officer*     *Commissioner of Patents and Trademarks*